(12) United States Patent
Parmelee

(10) Patent No.: US 7,883,326 B1
(45) Date of Patent: Feb. 8, 2011

(54) APPARATUS AND ASSEMBLY FOR INTERCHANGING INDICIA OF TIRE MOLDS

(75) Inventor: James Richard Parmelee, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/694,333

(22) Filed: Jan. 27, 2010

(51) Int. Cl.
*B29C 33/00* (2006.01)

(52) U.S. Cl. .................... 425/28.1; 249/103; 425/195

(58) Field of Classification Search ............. 425/28.1, 425/35, 195; 249/102, 103, 104
See application file for complete search history.

(56) References Cited

U.S. PATENT DOCUMENTS

| | | | | |
|---|---|---|---|---|
| 1,567,402 | A * | 12/1925 | Venn ..................... | 425/35 |
| 1,969,083 | A * | 8/1934 | Lawson .................. | 425/28.1 |
| 2,296,016 | A * | 9/1942 | Bostwick ................ | 425/28.1 |
| 2,685,874 | A | 8/1954 | Ford ...................... | 125/33 |
| 4,081,038 | A | 3/1978 | Andersson et al. ....... | 173/162 |
| 4,547,139 | A | 10/1985 | Hershberger ............ | 425/28 D |
| 4,745,980 | A | 5/1988 | Chung .................... | 173/93.7 |
| 4,903,784 | A | 2/1990 | Glaser .................... | 173/116 |
| 5,137,096 | A | 8/1992 | Druesdow ................ | 173/171 |
| 5,203,417 | A | 4/1993 | Glaser .................... | 173/200 |
| 5,939,002 | A | 8/1999 | Heindel ................... | 264/219 |
| 6,095,256 | A | 8/2000 | Lindsay .................. | 173/115 |
| 6,315,539 | B1 * | 11/2001 | Yutronkie et al. ........ | 425/28.1 |
| 6,508,315 | B1 | 1/2003 | Lindsay .................. | 173/115 |
| 6,557,647 | B2 | 5/2003 | White ..................... | 173/17 |
| 6,691,798 | B1 | 2/2004 | Lindsay .................. | 173/115 |
| 6,805,272 | B1 | 10/2004 | Sen-Mu et al. ........... | 227/130 |
| 6,942,476 | B2 * | 9/2005 | Parmelee et al. ......... | 425/28.1 |
| 6,986,394 | B2 | 1/2006 | Marsh ..................... | 173/13 |
| 6,997,269 | B1 | 2/2006 | Putney .................... | 173/29 |
| 7,306,047 | B2 | 12/2007 | Oda et al. ................. | 173/48 |

* cited by examiner

*Primary Examiner*—James Mackey
(74) *Attorney, Agent, or Firm*—Robert N. Lipcsik (57) ABSTRACT

An apparatus selectively forms indicia of a tire sidewall. The apparatus includes a tire mold member for vulcaninzing an uncured tire. The tire mold member includes a surface engageable with a portion of the uncured tire, a detachable indicia forming member engageable with a portion of the uncured tire to form indicia on a surface of the tire sidewall, and a housing for releasably retaining the indicia forming member on the tire mold member. The housing is fixed to the tire mold member and releasably secures the indicia to the tire mold member. The indicia forming member is secured to the housing by an impact device applied in a first direction and released from the housing by mechanical pressure to one end portion of the indicia forming member applied in the first direction.

18 Claims, 7 Drawing Sheets

APPARATUS AND ASSEMBLY FOR INTERCHANGING INDICIA OF TIRE MOLDS

FIELD OF THE INVENTION

The present invention relates to molds for curing tires and, more specifically, to a means for releasably retaining an indicia forming member on a portion of such a mold.

BACKGROUND OF THE INVENTION

Conventionally, various forms of indicia are provided on a sidewall of a tire. With respect to a given tire design, it may not be necessary or desirable to change certain indicia for the life of the mold. On the other hand, for indicia such as serial numbers or the like, it may be desirable or necessary to provide some means to be able to readily change such indicia with respect to groups of, or individual, tires.

A conventional tire mold may include a mold member having a surface which is engageable with a portion of a tire to form a surface on the tire during a tire vulcanizing or curing operation. The surface may form at least a portion of the exterior surface of a sidewall of a tire. The surface may be a surface of revolution having an axis corresponding to the axis of revolution of a tire cured in a mold.

An indicia forming member or coverplate may be attachable to the mold member. The coverplate may be provided with indicia forming means. Such indicia forming means may be projections extending from the coverplate or recesses in the coverplate depending on whether it is desirable to have the indicia which is formed on the tire to be recessed or raised.

A conventional mold member may be provided with a pair of keyhole slots spaced apart a predetermined distance angularly about the axis of revolution of the surface. The coverplate may be provided with a projection located adjacent each end thereof. Each projection may extend from the side of the coverplate opposite that which carries indicia forming elements. Each projection or keeper may have a cylindrical portion fixed at one end to the coverplate and extending from the coverplate at right angles to the general plane thereof. The outer end of each portion may terminate in an enlarged portion. The diameter and configuration of each enlarged portion may be such that it will fit freely within the enlarged portion of one of the keyhole slots in the mold member. The diameter of the portion of each projection may be selected so that the portion is slidably receivable within the narrower portion of a keyhole slot. The keyhole slots may be oriented in the mold member and spaced apart a distance corresponding to the spacing of the projections on the coverplate such that, when the coverplate is moved toward the mold member, the projections may enter and be received in the enlarged portions of these slots. Thereafter, translation of the coverplate in one direction will move the cylindrical portions of the projections into the narrower portions of the slots so that coverplate is retained on the mold member.

In order to provide selective retention of a coverplate on a mold, a conventional latch mechanism may be provided. The latch mechanism has comprised a body portion receivable within a recess or opening in the mold. The recess has been disposed approximately midway between keyhole slots. The latch mechanism has further comprised a plate seated on top of the body and releasably secured thereto by a pair of screws. The plate closes the recess in the mold in which the body of the latch mechanism is received, except for a keyhole slot in the plate similar to the above described keyhole slots and oriented in the same manner as those keyhole slots. Thus, the narrower portion of the slot extends from the enlarged portion thereof in the same direction along the line as the narrower portions of the slots extend from the enlarged portions thereof.

The conventional latch mechanism has been provided with a recess, which in conjunction with the plate, provides a chamber within the body. Slidably received within the chamber are cam means in the form of a slide mounted for movement in a direction in alignment with the narrow portion of the keyhole slot in the plate. The conventional slide is movable between a retracted position and a latching position. The slide is retained in its retracted position by a spring loaded detent which extends coaxially of the enlarged portion of the keyhole slot and is received within an opening in the body of the latch mechanism. The spring for the detent is received within the same opening as the detent. The end of the opening, which receives the detent and spring, is closed at the end thereof opposite the detent by set screws, which also serve to preload the spring to urge the detent toward the chamber.

The conventional slide is maintained in its retracted position by the detent, one end of which is urged into the recess and into obstructing relation with the slide to prevent movement of the slide in a direction toward the narrower portion of the keyhole slot. A preloaded spring is engaged between the end of the slide opposite the detent and a wall of the chamber and urges the slide in a direction toward the narrower portion of the keyhole slot. The free length of the spring is such that when the slide is in its latching position, the spring will still preload the slide sufficiently for a purpose to be later described.

A conventional projection or keeper is carried by the coverplate. The keeper extends from the side of the coverplate opposite the indicia forming portion of the insert and is positioned between the projections such that when the enlarged ends of the projections are positioned in registry with the enlarged portions of the keyhole slots, the keeper will be in registry with the enlarged portion of the keyhole slot in the top plate of the latch mechanism. The keeper extends from the coverplate at right angles to the general plane thereof and has a generally cylindrical cross-section. The keeper at the end thereof adjacent the coverplate is cutaway, or formed, to provide parallel surfaces. When the coverplate is located such that the projections are in registry with the enlarged portions of their respectively associated keyhole slots, the surfaces will be parallel to the sidewalls of the narrower portion of the keyhole slot. Additionally, the surfaces are spaced apart a distance only slightly less than the spacing of the sidewalls of the narrow portion of the slot. Thus, it will be seen that the forming of the surfaces on the projections provides a pair of slots formed in part by the projections and in part by the coverplate, with such slots being adapted to slidably receive the bordering edge portions of the narrower portion of the slot. The projection is further provided at the end thereof opposite the spring with an inclined cam surface which lies in a plane extending at right angles to the planes of the surfaces. The surface cooperates with a similarly inclined surface provided by the end of the slide opposite the spring.

To mount the conventional coverplate on the mold, the coverplate is positioned with the enlarged portions of the projections disposed in the enlarged openings of their respectively associated keyhole slots. The center portion of the coverplate is then pressed toward the mold whereby the distal end of the projection will engage the detent so that in response to further movement of the coverplate toward the mold, the detent will be depressed sufficiently against the force of the spring to permit the spring to move the slide in a direction toward the narrower portion of the slot. This movement of the slide moves the projection into the narrower portion of the slot whereby the coverplate will be captured and retained on the mold by the interrelationship of the slots formed by the coverplate and projection and the bordering edge portions of the narrow portion of the slot. The force of the spring maintains the projection engaged with the closed end of the narrower portion of the slot. Concommittantly with the movement of the projection into the narrow end of the keyhole slot, the projections will be moved into the narrower ends of the slots, whereby the end portions of the coverplate will be retained on the mold.

To disengage the conventional coverplate from the mold, the coverplate is moved manually in a direction to move the projection into registry with the enlarged portion of the slot and against the force of the spring. Upon sufficient movement of the coverplate in this direction, the detent is urged outwardly into the chamber and into obstructing relationship with the slide to retain the slide in its retracted position. As the coverplate is moved in a direction to release it from the mold, the inclined surfaces on the slide and projection, respectively, act as camming surfaces to move the projection and thus the coverplate in a direction away from the surface of the mold.

It would be desirable to provide a more efficient and faster method and apparatus for interchanging indicia of tire molds.

One conventional impact device may use compressed air for suddenly pushing a piston within the impact device. The pushed piston drives a striking pin to drive an impact head portion that is arranged in a front end of the conventional impact device. The conventional impact device may comprise a main body having a cavity defined for receiving a spring and a sleeve that has an annular groove defined in an outer periphery of the sleeve. A passage may be defined in the main body and may selectively communicate with the annular groove for allowing compressed air flow into the sleeve. A block and a cylinder may be sequentially received in the cavity. A striker may be reciprocally and movably received in the cylinder due to the block and the compressed air. A shaft may extend longitudinally into the cylinder and the striker may be moved to impact the shaft for driving an impact head portion when the shaft and the cylinder are backward pushed to make the annular groove communicate with the passage to guide the compressed air flowing to the cylinder for pushing the impact head portion. Another conventional impact device may use electrical power for suddenly driving an impact head portion similar to the compressed air device.

SUMMARY OF INVENTION

An apparatus in accordance with the present invention selectively forms indicia of a tire sidewall. The apparatus includes a tire mold member for vulcaninzing an uncured tire. The tire mold member includes a surface engageable with a portion of the uncured tire, a detachable indicia forming member engageable with a portion of the uncured tire to form indicia on a surface of the tire sidewall, and a housing for releasably retaining the indicia forming member on the tire mold member. The housing is fixed to the tire mold member and releasably secures the indicia to the tire mold member. The indicia forming member is secured to the housing by an impact device applied in a first direction and released from the housing by mechanical pressure to one end portion of the indicia forming member applied in the first direction.

According to another aspect of the present invention, the indicia forming member defines projections for engaging the tire sidewall.

According to still another aspect of the present invention, the indicia forming member defines recesses for engaging the tire sidewall.

According to yet another aspect of the present invention, the housing is fixed to the tire mold member by a threaded fastener.

According to still another aspect of the present invention, the housing has semicircular end portions, each end portion extending from a main body portion of the housing in opposite directions.

According to yet another aspect of the present invention, the end portions and main body portion of the housing form a shape corresponding to a slot in the tire mold member.

According to still another aspect of the present invention, the indicia forming member is secured to the housing in an interference fit.

According to yet another aspect of the present invention, the indicia forming member includes an indicia portion and two rail members for engaging a bottom surface of the housing such that an outer surface of the indicia portion is flush with an outer surface of the housing and an outer surface of the mold member.

According to still another aspect of the present invention, the housing has a bore for receiving a fastener and thereby attaching the housing to the mold member.

According to yet another aspect of the present invention, a drive head of the impact device engages the indicia forming member and drives the indicia forming member into an interference fit with an interior portion of the housing.

According to still another aspect of the present invention, a clip member secures the indicia forming member to the drive head while the impact device is aligned with the housing and the mold member.

According to yet another aspect of the present invention, the mechanical pressure for releasing the indicia forming member is applied in the first direction by a hand chisel.

According to still another aspect of the present invention, the two rail members of the indicia forming member each have curved rail ends for causing the indicia forming member to rotate about the curved rail ends and thereby move an end of the indicia forming member away from the mold member in a second direction opposite the first direction.

According to yet another aspect of the present invention, the indicia forming member is removed from the housing and mold member by tongs.

According to still another aspect of the present invention, the indicia forming member is constructed of aluminum.

According to yet another aspect of the present invention, the indicia forming member is constructed of PEEK.

According to still another aspect of the present invention, the housing is constructed of aluminum.

According to yet another aspect of the present invention, the housing is constructed of cast iron.

BRIEF DESCRIPTION OF THE DRAWINGS

This and other objects, aspects and features of the invention will be apparent from the following descriptions and accompanying drawings in which.

DESCRIPTION OF AN EXAMPLE EMBODIMENT OF THE PRESENT INVENTION

Figure 1:
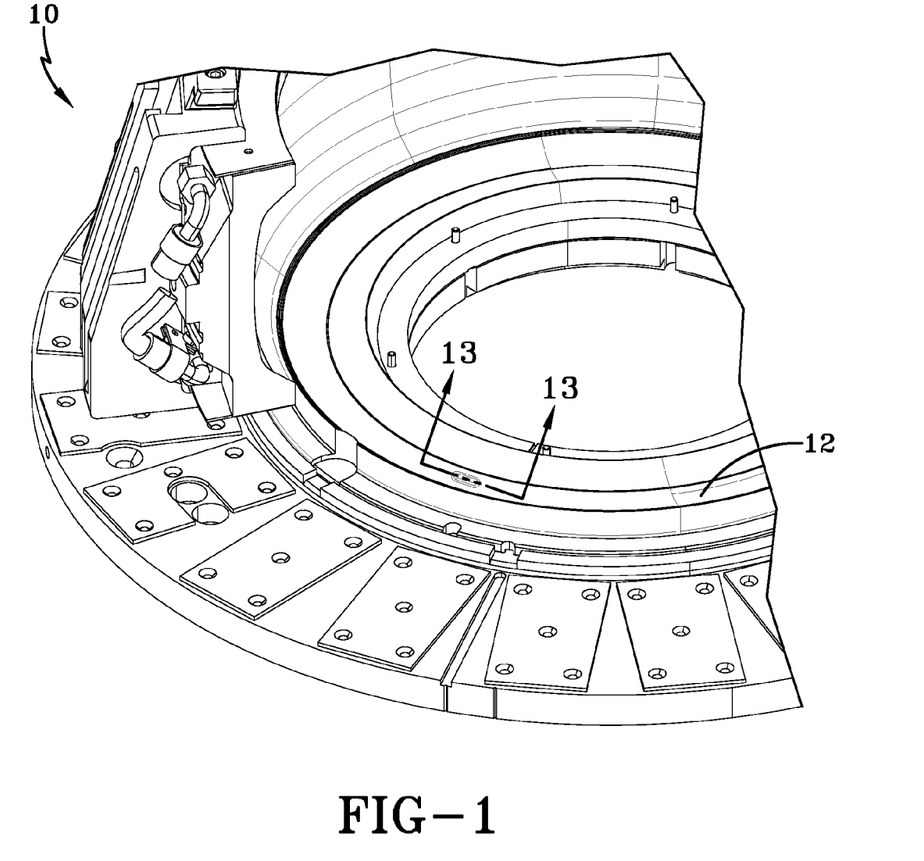
FIG. 1 is a schematic perspective view of an example tire mold with an indicia forming member in accordance with the present invention disposed therein.
Figure 2:
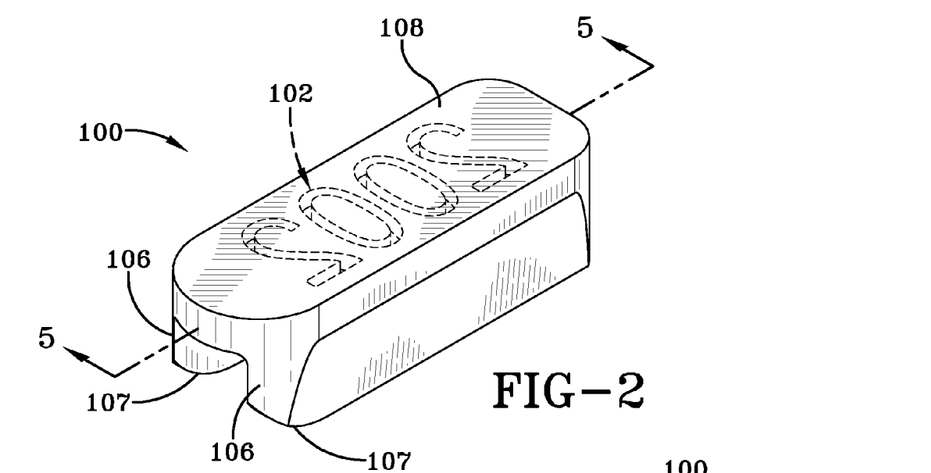
FIG. 2 is a schematic perspective view of an example indicia forming member for use with a tire mold in accordance with the present invention.
Figure 3:
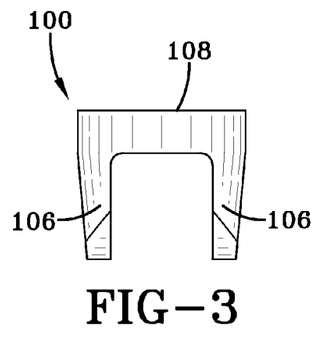
FIG. 3 is a schematic end elevation view of the indicia forming member of FIG. 2.
Figure 4:
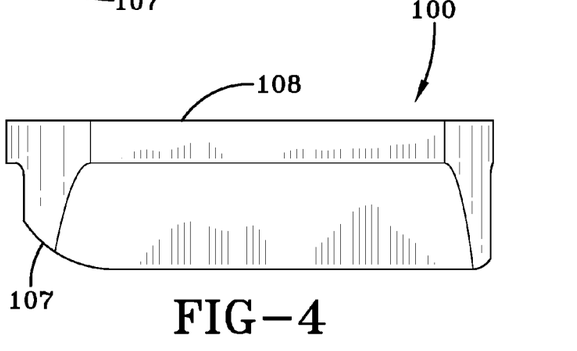
FIG. 4 is a schematic side elevation view of the indicia forming member of FIG. 2.
Figure 5:
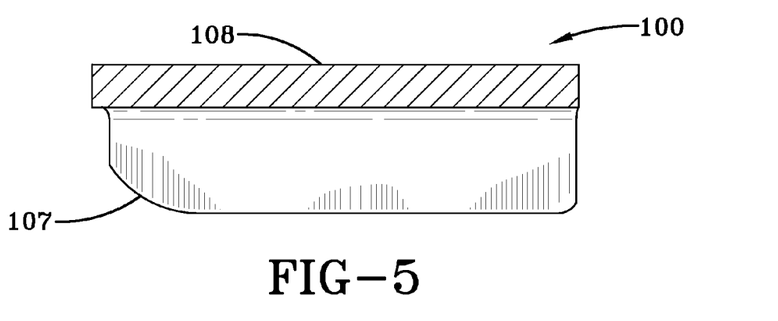
FIG. 5 is a schematic sectional view taken along line 5-5 in FIG. 2.

FIG. 1 shows a tire mold 10 for use with the present invention. The tire mold 10 has a surface 12 which is engageable with a portion of a tire to form a surface on the tire during a tire vulcanizing or curing operation. More specifically, the surface 12 will form at least a portion of the exterior surface of a sidewall of a tire. The surface 12 is a surface of revolution having an axis corresponding to the axis of revolution of a tire cured in the tire mold 10. It is to be understood that while the specific embodiment is being described in connection with an external sidewall surface of a tire, the present invention is readily adaptable to other situations and apparatus wherein any portion of a tire or tire component is being formed.

As shown in FIGS. 6-17, attachable to the mold member 10 is a housing 16. The housing 16 is provided with indicia forming means such as shown at 100 in FIGS. 2-5. Such indicia forming means 100, or plate member, may define projections (not shown) extending from the housing 16 or recesses 102 into the interior of the housing 16, depending on whether it is desirable to have the indicia which is formed on the tire to be depressed or raised.

Figure 6:
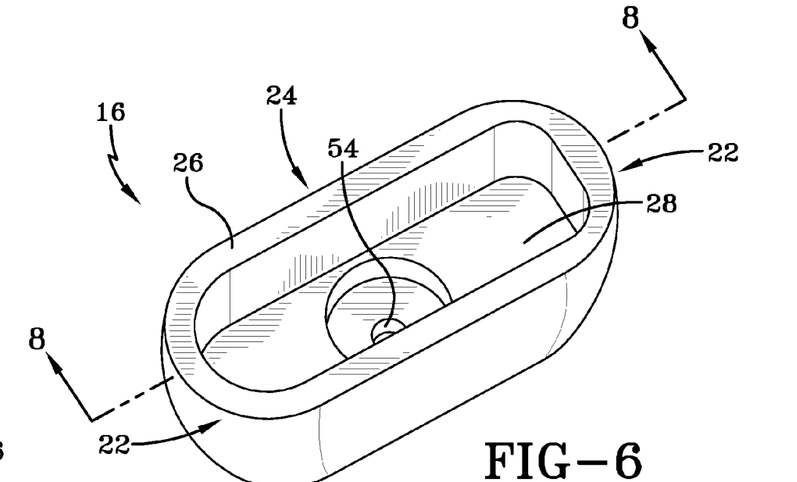
FIG. 6 is a schematic perspective view of a housing for use with the indicia forming member of FIG. 2.
Figure 7:
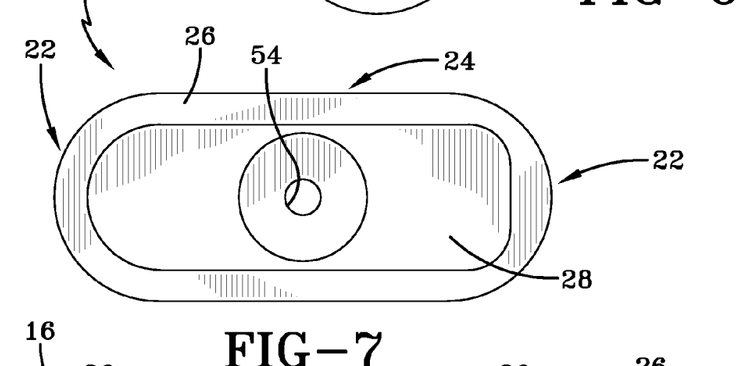
FIG. 7 is a schematic top view of the housing of FIG. 6.
Figure 8:
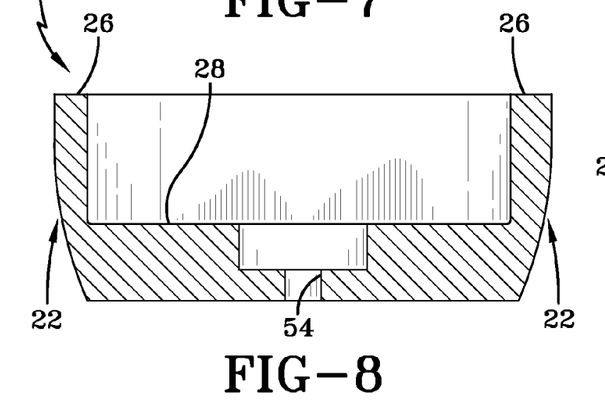
FIG. 8 is a schematic sectional view of the housing of FIG. 6 taken along line 8-8.
Figure 9:
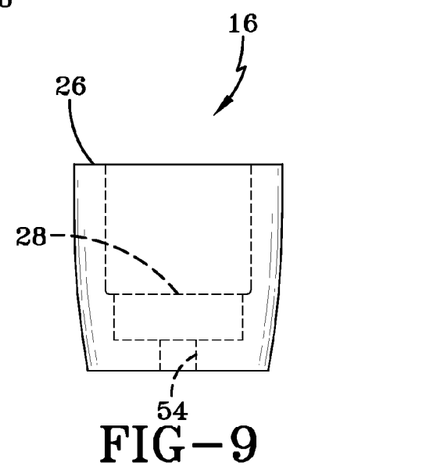
FIG. 9 is a schematic end view of the housing of FIG. 6.

As shown in FIGS. 13-17, the mold 10 may be provided with a threaded bore 18 for attaching the housing 16 to the mold member 10 with a suitable fastener 52. The housing 16 may be provided with semicircular end portions 22 as shown in FIGS. 6-7. Each end portion 22 may extend from a main body portion 24 of the housing 16. The overall shape of the housing 16 corresponds to a slot 14 in the mold member 10.

The indicia forming member 100 is secured to the housing 16 in an interference fit for transferring data, via the projections/recesses 102, into the sidewall of a tire during vulcanization and curing by the mold member 10. The unique shape and configuration of the indicia forming member 100 allows for easy placement (FIGS. 13-14) onto the housing/mold member 10, 16 and removal (FIGS. 15-17) from the housing/mold member without removing the housing from the mold member or the mold member from the tire press itself.

Figure 14:
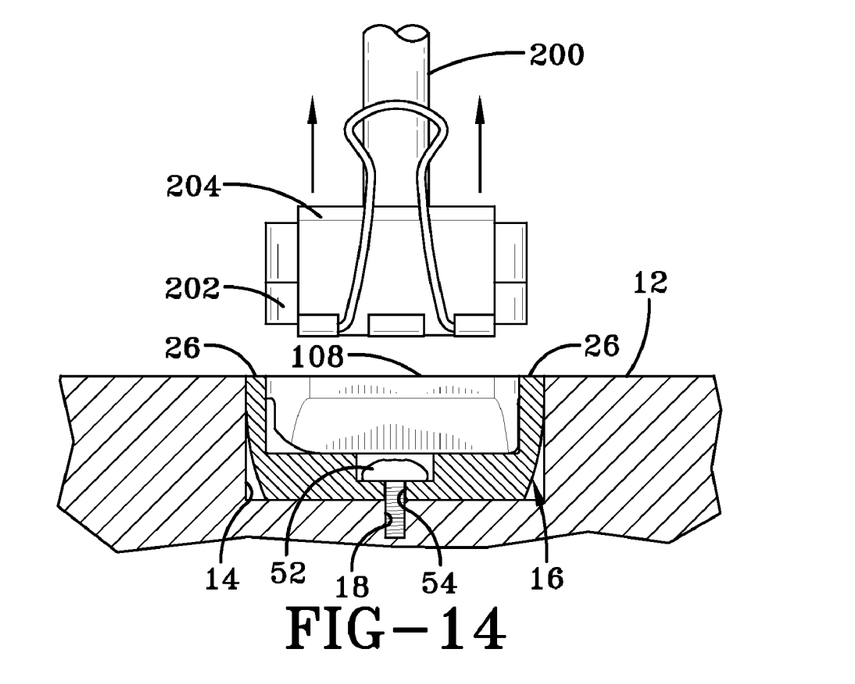
FIG. 14 is a schematic side elevation view of a second step of placing an indicia forming member on a tire mold, taken along line 13-13 in FIG. 1.
Figure 15:
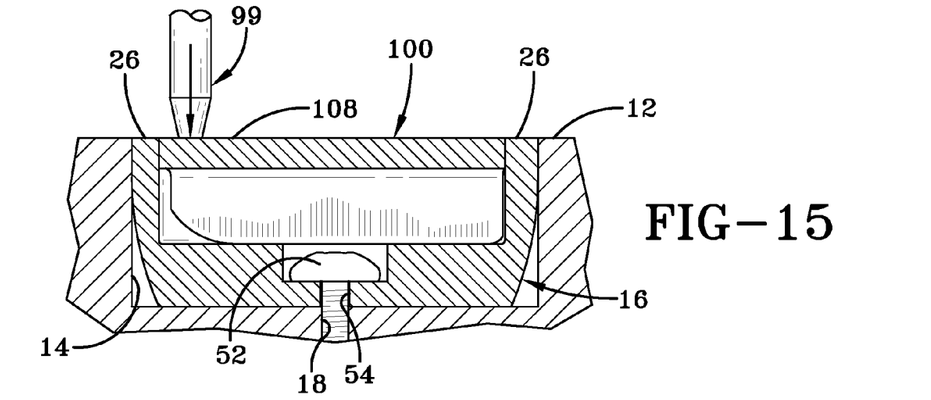
FIG. 15 is a schematic side elevation view of a first step of removing an indicia forming member from a tire mold.

As shown in FIGS. 2-5, an example indicia forming member 100 in accordance with the present invention may include an indicia portion containing the projections/recesses 102 and two rail members 106 for engaging a bottom surface 28 of the interior of the housing 16 such that an outer surface 108 of the indicia portion is flush with an outer surface 26 of the housing 16 and the mold surface 12 (FIGS. 14-15).

As shown in FIGS. 6-9 and described above, the housing 16 may have a bore 54 for receiving the fastener 52 and attaching the housing 16 to the mold member 10. The housing 16 may thus be replaced if damaged during curing or replacing of the indicia forming means 100. The semicircular end portions 22 may extend from the main body portion 24 of the housing 16. The overall outer shape of the housing 16 corresponds to the slot 14 in the mold member 10 and defines an interior for receiving the indicia forming means 100. The bottom surface 28 limits the amount that the indicia forming means 100 may be inserted into the interior of the housing 16. The housing may be constructed of suitable material compatible with the specific mold member material. Examples may be aluminum, steel, or cast iron.

Figure 10:
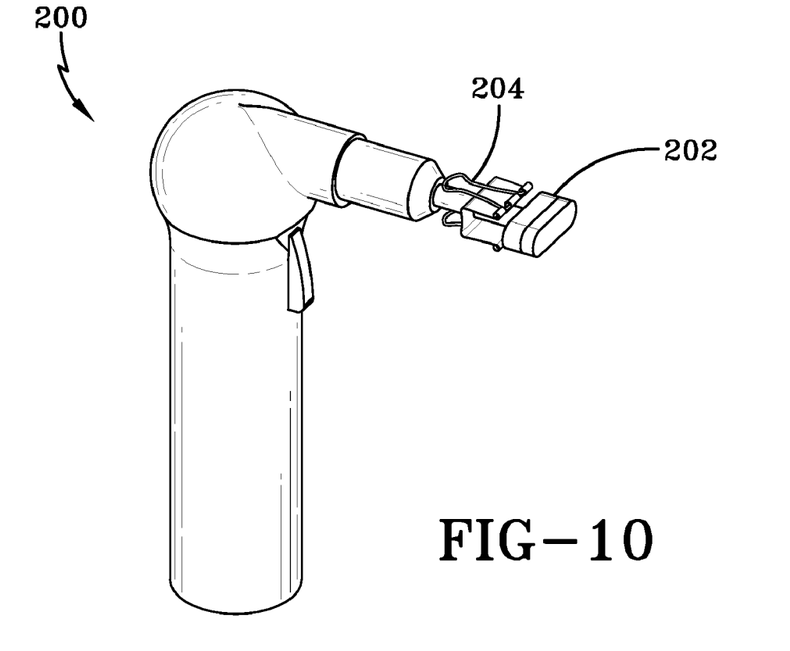
FIG. 10 is a schematic perspective view of an example impact device for use with an indicia forming member and a tire mold in accordance with the present invention.
Figure 11:
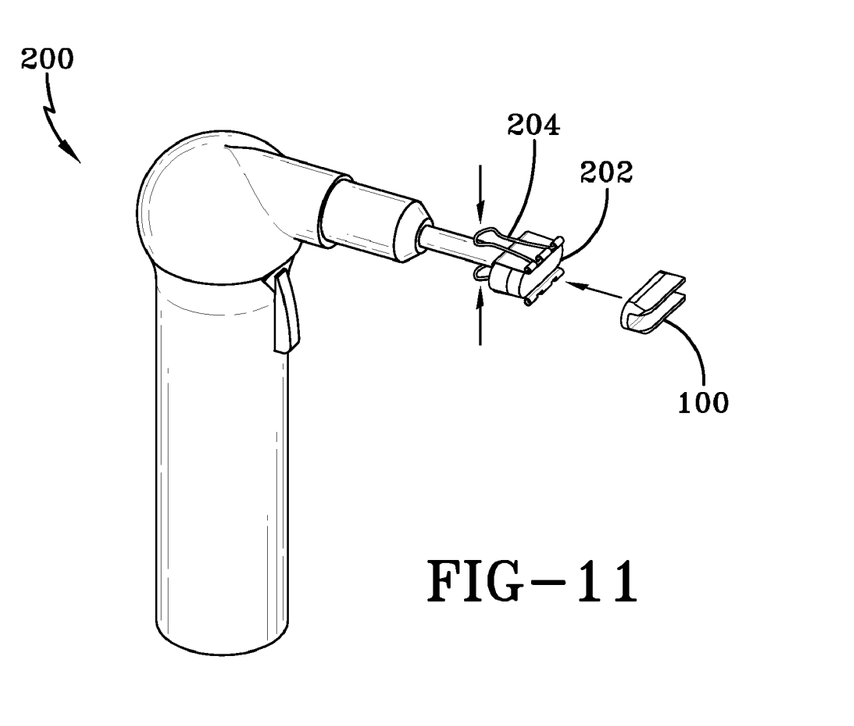
FIG. 11 is a schematic perspective view of the impact device of FIG. 10 and an example indicia forming member.
Figure 12:
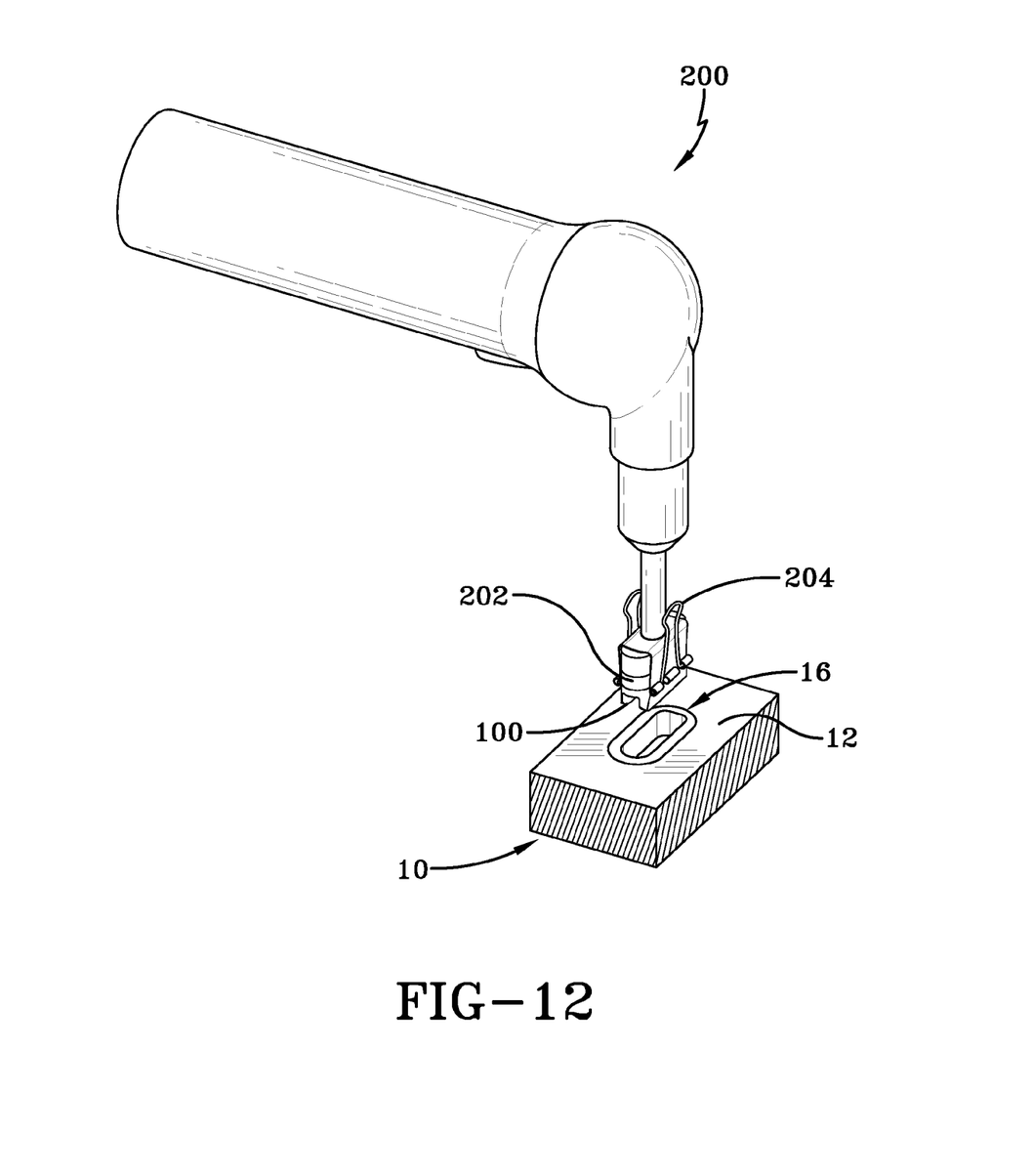
FIG. 12 is a schematic perspective view of placement of an indicia forming member on a tire mold.

FIGS. 10-12 show an impact device for use with the indicia forming means 100, housing 16, and mold member 10 described above. The type of impact device may be any suitable device. The impact device 200 includes a drive head 202 shaped to engage the indicia forming means 100 and drive the indicia forming means into the interference fit with the interior of the housing 16. The drive head 202 may be fastened to a standard impact device. The impact device 200 further includes a clip member 204 for securing the indicia forming means 100 to the drive head 202 (FIG. 11) while the impact device is aligned with housing 16 and mold member 10 (FIG. 12).

Figure 13:
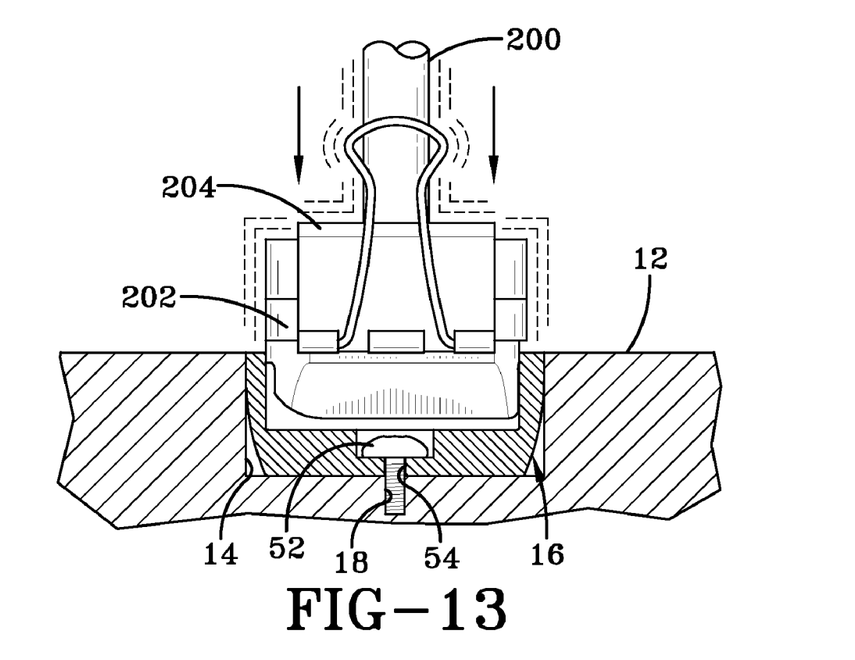
FIG. 13 is a schematic side elevation view of a first step of placing an indicia forming member on a tire mold, taken along line 13-13 in FIG. 1.

The drive head/indicia forming means 202, 100 may first be aligned with the housing 16 (FIG. 13). Then, the impact device 200 may be energized thereby driving the indicia forming means 100 into the housing 16 and disengaging the clip member 204. The drive head 202 may thus be withdrawn and the mold member 10 is ready for curing and vulcanizing a green tire (FIG. 14).

Figure 16:
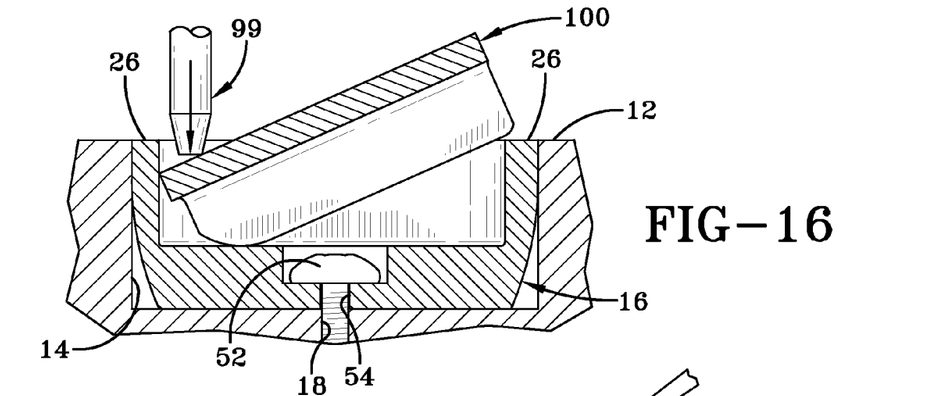
FIG. 16 is a schematic side elevation view of a second step of removing an indicia forming member from a tire mold.
Figure 17:
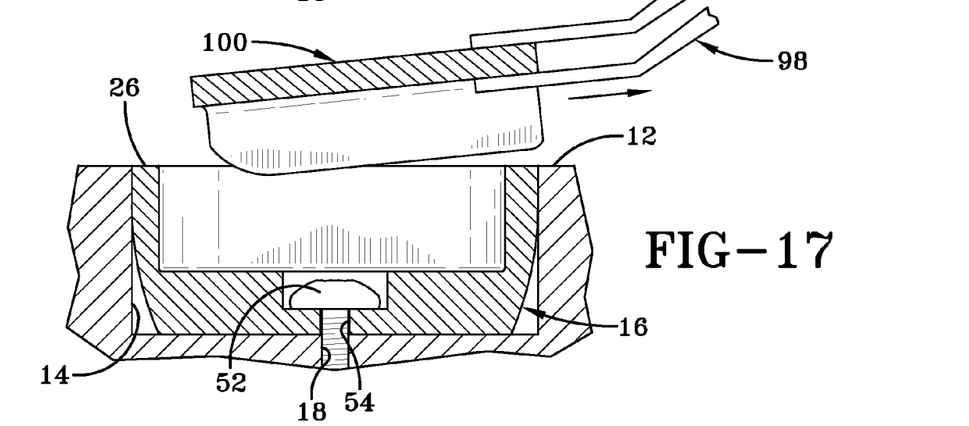
FIG. 17 is a schematic side elevation view of a third step of removing an indicia forming member from a tire mold.

When it becomes desirable to replace the indicia forming means 100, a hand chisel 99 or similar tool may be used to apply mechanical pressure to one end portion of the indicia forming means in the same direction that the drive head 202 acted to secure the indicia forming means to the housing 16. Pounding the chisel 99 toward the mold member 10 at the end of the indicia forming means 100 having curved rail ends 107 will cause the indicia forming means to rotate about the curved rail ends and thereby moving the opposite end of the indicia forming means outward away from the mold member (FIG. 16). Tongs 98 or a similar tool may then grasp the opposite end of the indicia forming means 100 and completely remove the indicia forming means from the mold member 10.

The above described method, apparatus, and assembly provides an ergonomic, safe, and effective technique for installing weekly date code disposable indicia forming means into either a top or a bottom tire mold cavity thus replacing the hammer and punch method. Specifically, it has been virtually impossible to use a hammer and punch for installation in a top half of a mold while the mold remains in the tire press. This technique further eliminates costly repairs and curing down time. Additionally, the only part that should be damaged during indicia changes is the housing, which also can be replaced without a mold change-out.

The indicia forming means 100 may be constructed of any suitable material, such as steel, aluminum, or thermoplastic material. One example is polyetheretherketone, or PEEK. PEEK is high temperature resistant engineered thermoplastic with excellent chemical and fatigue resistance plus thermal stability. With a maximum continuous working temperature of 480° F., PEEK has excellent retention of mechanical properties up to 570° F. in a steam or high-pressure water environment. PEEK may be inert to all common solvents and resists a wide range of organic and inorganic liquids. PEEK may retain flexural and tensile properties at very high temperatures—in excess of 482° F. The addition of glass fiber and carbon fiber reinforcements may further enhance the mechanical and thermal properties of a basic PEEK material.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for selectively forming indicia of a tire sidewall, the apparatus comprising:

a tire mold member for vulcanizing an uncured tire, the tire mold member including a surface engageable with a portion of the uncured tire, a detachable indicia forming member engageable with a portion of the uncured tire to form indicia on a surface of the tire sidewall, and a housing for releasably retaining the indicia forming member on the tire mold member, the housing being fixed to the tire mold member and releasably securing the indicia forming member to the tire mold member, the indicia forming member being securable to the housing by an impact device applied in a first direction and releasable from the housing by mechanical pressure to one end portion of the indicia forming member applied in the first direction.

2. A tire mold as set forth in claim 1 wherein the indicia forming member defines projections for engaging the tire sidewall.

3. A tire mold as set forth in claim 1 wherein the indicia forming member defines recesses for engaging the tire sidewall.

4. A tire mold as set forth in claim 1 wherein the housing is fixed to the tire mold member by a threaded fastener.

5. A tire mold as set forth in claim 1 wherein the housing has semicircular end portions, each end portion extending from a main body portion of the housing in opposite directions.

6. A tire mold as set forth in claim 5 wherein the end portions and main body portion of the housing form a shape corresponding to a slot in the tire mold member.

7. A tire mold as set forth in claim 1 wherein the indicia forming member is secured to the housing in an interference fit.

8. A tire mold as set forth in claim 1 wherein the indicia forming member includes an indicia portion and two rail members for engaging a bottom surface of the housing such that an outer surface of the indicia portion is flush with an outer surface of the housing and an outer surface of the mold member.

9. A tire mold as set forth in claim 1 wherein the housing has a bore for receiving a fastener and thereby attaching the housing to the mold member.

10. A tire mold as set forth in claim 1 wherein a drive head of the impact device engages the indicia forming member and drives the indicia forming member into an interference fit with an interior portion of the housing.

11. A tire mold as set forth in claim 10 wherein a clip member secures the indicia forming member to the drive head while the impact device is aligned with the housing and the mold member.

12. A tire mold as set forth in claim 1 wherein the mechanical pressure for releasing the indicia forming member is applied in the first direction by a hand chisel.

13. A tire mold as set forth in claim 8 wherein the two rail members of the indicia forming member each have curved rail ends for causing the indicia forming member to rotate about the curved rail ends and thereby move an end of the indicia forming member away from the mold member in a second direction opposite the first direction.

14. A tire mold as set forth in claim 1 wherein the indicia forming member is removable from the housing and mold member by tongs.

15. A tire mold as set forth in claim 1 wherein the indicia forming member is constructed of aluminum.

16. A tire mold as set forth in claim 1 wherein the indicia forming member is constructed of PEEK.

17. A tire mold as set forth in claim 1 wherein the housing is constructed of aluminum.

18. A tire mold as set forth in claim 1 wherein the housing is constructed of cast iron.

* * * * *